(12) United States Patent
Moser et al.

(10) Patent No.: US 8,342,745 B2
(45) Date of Patent: Jan. 1, 2013

(54) METHOD FOR PASSIVE DETERMINATION OF THE OPERATING TEMPERATURE IN A THERMALLY HIGHLY LOADED DEVICE, AND APPARATUS FOR CARRYING OUT THE METHOD

(75) Inventors: Roland Moser, Zurich (CH); Klaus Germerdonk, Ennetbaden (CH); Bernd Rabensteiner, Rieden (CH); Peter Lang, Sulz (CH)

(73) Assignee: ALSTOM Technology Ltd, Baden (CH)

( * ) Notice: Subject to any disclaimer, the term of this patent is extended or adjusted under 35 U.S.C. 154(b) by 900 days.

(21) Appl. No.: 12/403,918

(22) Filed: Mar. 13, 2009

(65) Prior Publication Data

US 2009/0252194 A1  Oct. 8, 2009

Related U.S. Application Data

(63) Continuation of application No. PCT/EP2007/059159, filed on Sep. 3, 2007.

(30) Foreign Application Priority Data

Oct. 2, 2006  (CH) ....................... 1565/06

(51) Int. Cl.
*G01K 3/00* (2006.01)
*G01N 25/00* (2006.01)
*G01D 21/00* (2006.01)
*F01D 25/00* (2006.01)

(52) U.S. Cl. ........................................ 374/106; 374/163
(58) Field of Classification Search .................. 374/106, 374/110–112, 163, 166
See application file for complete search history.

(56) References Cited

U.S. PATENT DOCUMENTS

| | | | | | |
|---|---|---|---|---|---|
| 2,614,430 | A | * | 10/1952 | Ballard et al. | 374/106 |
| 3,175,401 | A | * | 3/1965 | Geldmacher | 374/106 |
| 3,430,491 | A | * | 3/1969 | Gignilliat | 374/106 |
| 3,631,720 | A | * | 1/1972 | Weinstein et al. | 374/106 |
| 3,998,098 | A | * | 12/1976 | Chilton | 374/106 |
| 4,248,089 | A | * | 2/1981 | Heinmets | 374/162 |
| 4,345,470 | A | * | 8/1982 | Hof et al. | 374/106 |
| 4,650,707 | A | * | 3/1987 | Crigger | 428/100 |
| 4,779,995 | A | * | 10/1988 | Santacaterina et al. | 374/162 |
| 5,094,545 | A | * | 3/1992 | Larsson et al. | 374/160 |
| 6,974,249 | B1 | * | 12/2005 | Fair et al. | 374/102 |
| 7,490,575 | B2 | * | 2/2009 | Taylor et al. | 116/216 |

(Continued)

FOREIGN PATENT DOCUMENTS

JP  1143748 A  6/1989

(Continued)

*Primary Examiner* — Randy W Gibson
(74) *Attorney, Agent, or Firm* — Volpe and Koenig, P.C.

(57) ABSTRACT

A method is provided for determination of an operating temperature in a thermally highly loaded device. Multiple individual passive measurement elements, having a measurable physical parameter depending on a constant temperature set during heat treatment, are provided. The parameter is set differently for each of the different measurement elements which are combined to form an array. In a first measurement, values of the physical parameter for the array are determined before the array is subjected to the operating temperature. The array is subjected to the operating temperature in the device and in a second measurement, values are determined for all the measurement elements in the array. First and second measurement values of the physical parameter for each of the measurement elements are compared and the temperature of the heat treatment of that measurement element whose value of the physical parameter has changed the least is taken as the measured temperature.

6 Claims, 3 Drawing Sheets

U.S. PATENT DOCUMENTS

| | | | |
|---|---|---|---|
| 8,136,988 B2 * | 3/2012 | Geren et al. | 374/187 |
| 8,177,423 B1 * | 5/2012 | Fair et al. | 374/106 |
| 2005/0178314 A1 * | 8/2005 | McGuire | 116/216 |
| 2006/0056959 A1 | 3/2006 | Sabol et al. | |
| 2006/0207263 A1 | 9/2006 | Stocker et al. | |
| 2010/0290503 A1 * | 11/2010 | Rumpf et al. | 374/163 |
| 2012/0027045 A1 * | 2/2012 | Mclellan et al. | 374/160 |

FOREIGN PATENT DOCUMENTS

| | | |
|---|---|---|
| JP | 2001305084 A | 10/2001 |
| WO | 2006007056 A1 | 1/2006 |

\* cited by examiner

METHOD FOR PASSIVE DETERMINATION OF THE OPERATING TEMPERATURE IN A THERMALLY HIGHLY LOADED DEVICE, AND APPARATUS FOR CARRYING OUT THE METHOD

CROSS REFERENCE TO RELATED APPLICATION

This application is a continuation of International Application No. PCT/EP2007/059159 filed Sep. 3, 2007, which claims priority to Swiss Patent Application No. 01565/06, filed Oct. 2, 2006, the entire contents of both of which are incorporated by reference as if fully set forth.

FIELD OF INVENTION

The present invention relates to the field of temperature metrology. It relates in particular to a method for passive determination of the operating temperature in a thermally highly loaded device, and to an apparatus for carrying out the method.

BACKGROUND

In the field of thermal machines (for example gas turbines) and boilers, it is of very major importance to know the actual operating temperatures (typically 700-1000° C.) at various points in the apparatus. However, it is frequently impossible to retrospectively additionally fit active (wired) sensors in an apparatus which is already in use, as a result of which passive sensors, which indicate the temperature by a (permanent) change in their physical characteristics, are the means of choice in situations such as these.

Thermal paint is known, a paint which changes its color permanently as a function of temperature. Among the various disadvantages of this solution, the necessity should be stressed, in particular, for the apparatus to be disassembled before the parts to be investigated can be painted, the relative inaccuracy of the temperature determination, and the need for a closely monitored "extra run" of the apparatus, as a result of which the measurement does not reflect the normal operating conditions. One major disadvantage is that the chemical reaction which leads to the color change is not reversible. It is therefore possible to measure only the maximum temperature reached on each occasion throughout the entire operation.

Furthermore, metallographic temperature determination is known, but this is not non-destructive and is therefore not feasible for the stated applications.

In addition to the thermal paint technique, there are numerous other experiments involving the part of the apparatus to be investigated being provided with a thick-film coating which has thermal memory characteristics, that is to say which uses a stable change in the molecular structure with a number of the high-temperature operations to which it was most recently subjected.

An ideally reversible process (reversible in the sense that the process follows the operating temperature and does not just register the highest temperature measured in each case) leads to a measurable change in the physical characteristics (variables, parameters), which may be electrical (resistivity), magnetic (permeability, magnetization, magnetic saturation), mechanical (hardness, modulus of elasticity, Poissin ratio, yield point, strain, density), acoustic (compression wave velocity, shear-wave velocity, bar velocity), thermal (thermal conductivity and strain) or optical (color change). Once the coating has cooled down, the aim is to determine the last high-temperature operation by subjecting the parts investigated to various heat treatments, and by finding the sought temperature through the use of empirical interpolation rules.

SUMMARY

The present disclosure is directed to a method for passive determination of an operating temperature in a thermally highly loaded device. The method includes providing a plurality of individual passive measurement elements, which have at least one measurable physical parameter that depends unambiguously on a constant temperature, which is set during heat treatment of the measurement element or of a material which is used in the measurement element. The parameter is set differently for the different measurement elements. The method also includes combining the individual measurement elements to form a one-dimensional or multi-dimensional array such that the entire array is subject to essentially only one temperature during the measurement of the operating temperature. The method also includes determining, in a first measurement, values of the physical parameter for all the measurement elements in the array, before the array is subjected to the operating temperature to be measured. The method further includes subjecting the array, over a relatively long time period, to the operating temperature to be measured in the device and determining, in a second measurement, values of the physical parameter for all the measurement elements in the array. The method also includes comparing the values of the physical parameter measured in the first and the second measurement for each of the measurement elements with one another and the temperature of the heat treatment of that measurement element whose value of the physical parameter has changed the least in the two measurements is taken as the measured temperature.

The disclosure is also directed to an apparatus for carrying out passive determination of an operating temperature in a thermally highly loaded device. The apparatus includes a plurality of individual passive measurement elements, which have at least one measurable physical parameter that depends unambiguously on a constant temperature which is set during heat treatment of the measurement element or of a material which is used in the measurement element. The parameter is set differently for the different measurement elements. The individual measurement elements are combined to form an array such that the entire array is subject to essentially only one temperature during the measurement of the operating temperature.

BRIEF DESCRIPTION OF THE DRAWINGS

The invention will be explained in more detail in the following text with reference to exemplary embodiments and in conjunction with the drawing, in which.

DETAILED DESCRIPTION OF THE PREFERRED EMBODIMENTS

Introduction to the Embodiments

In one aspect, a method is provided for determining of the operating temperature in a thermally highly loaded apparatus, which method avoids the disadvantages of known methods and is distinguished by the capability to be carried out in a simpler manner, good accuracy and flexible use.

It is provided that a set of thermal memory elements be subjected to the high temperatures, which are to be determined, with each element in the set previously having been subjected to a heat treatment at a well-defined temperature, which differs from one element to another. That element whose heat treatment temperature is closest to the operating temperature will indicate the least changes in its physical characteristics. The resolution is in this case a function of the accuracy with which the heat treatment was previously applied to the elements.

One refinement of the method is distinguished in that in the course of the comparison of the values from the first and the second measurement, the measured values of the physical parameter are subtracted from one another in pairs. However, it is also possible to use other mathematical approaches for comparison of the two measurements. Another refinement of the disclosure is that in order to set the different physical parameter in the measurement elements, the measurement elements are each subjected to a heat treatment at a different temperature, wherein the different temperatures of the heat treatment are in a predetermined temperature range and are distributed uniformly over the predetermined temperature range.

One refinement of the apparatus according to the disclosure is distinguished in that the measurement elements are solid bodies with a volume of a few mm$^3$.

DETAILED DESCRIPTION

Figure 1:
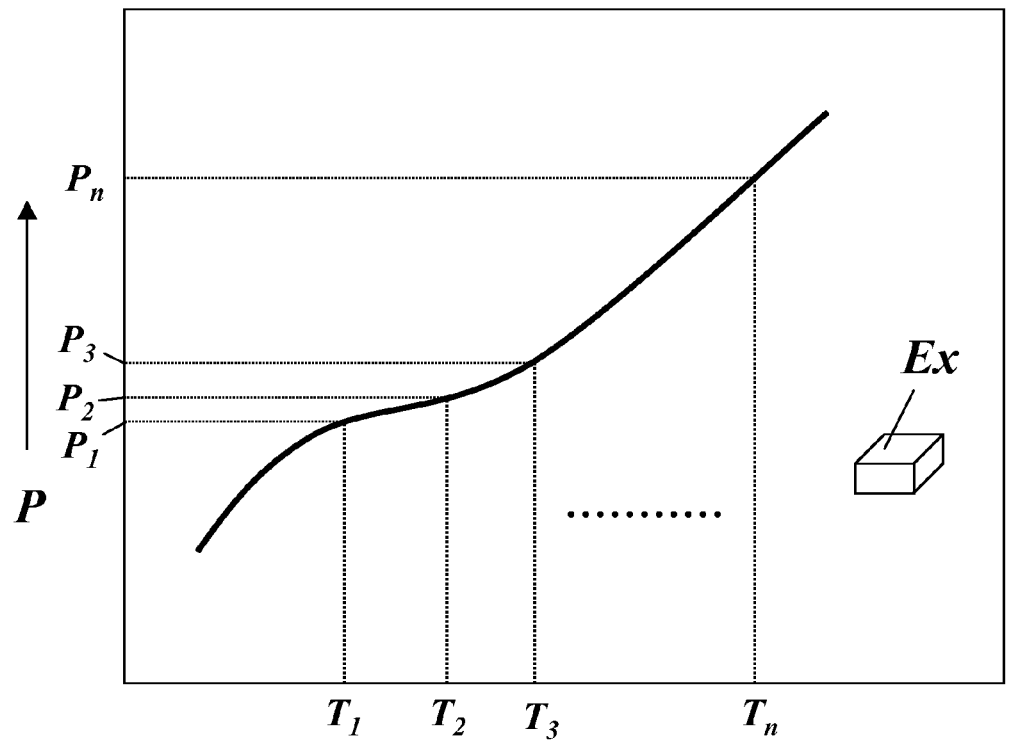
FIG. 1 shows an example of the dependency of a physical parameter P on the heat treatment temperature $T_{HT}$ of the elements with temperature memory, according to the invention.

As shown in FIG. 1, an exemplary embodiment as described in the following text is based on a measurement element Ex, which by way of example is cuboid, with the edge lengths 2×2×1 mm, which is composed of a material with a physical parameter P, for example electrical conductivity, which depends, on the basis of the curve illustrated in FIG. 1, on the temperature $T_{HT}$ at which the measurement element Ex was subjected to a relatively long-lasting heat treatment (HT). Other physical parameters of a mechanical, magnetic, visual or thermal nature may, of course, also be used.

The value of the physical parameter P reached during this heat treatment is maintained when the measurement element Ex is cooled down sufficiently quickly to normal temperature after the heat treatment. This makes it possible to produce correspondingly different values $P_1, \ldots, P_n$ of the physical parameter P for different measurement elements $E1, \ldots, En$ in an unambiguous and reversible manner by a choice of different temperatures $T_1, \ldots, T_n$ for the heat treatment. If, for example, the measurement element E3 whose physical parameter P has been set to a value $P_3$ by a heat treatment at the heat treatment temperature $T_{HT}=T_3$ is then subjected to a heat treatment at the lower temperature $T_2$, the value of the physical parameter P changes from $P_3$ to $P_2$.

When the aim is now to measure the current operating temperature on a part of the apparatus in a thermal machine (gas turbine or the like) or a boiler (steam generator etc.) which is operated at high temperatures, a multiplicity of individual measurement elements $E1, \ldots, En$ are produced which have been heat treated at different, graduated temperatures $T_1, \ldots, T_n$ and have correspondingly different values $P_1, \ldots, P_n$ of the selected physical parameter P. In order to allow accurate measurement of the temperature, the temperature values $T_1, \ldots, T_n$ should be distributed as uniformly as possible around the operating temperature to be expected.

Figure 2:
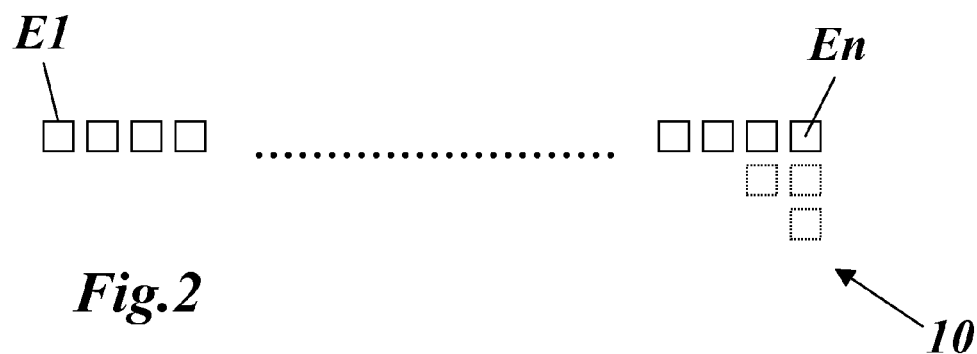
FIG. 2 shows an example of a 1-, 2- or 3-dimensional array of individual elements with temperature memory for measurement of the temperature.

The measurement elements $E1, \ldots, En$ prepared in this way are now combined as shown in FIG. 2 to form a linear, two-dimensional or three-dimensional element array 10 (FIG. 2 shows a linear array of the measurement elements $E1, \ldots, En$; a 2-dimensional array is indicated by the additional elements shown by dots). When choosing the element array 10, care should be taken to ensure that the individual measurement elements $E1, \ldots, En$ contained therein are as far as possible all subjected to the same operating temperature during the measurement at the subsequent measurement location, in order to allow unambiguous temperature determination.

Figure 3:
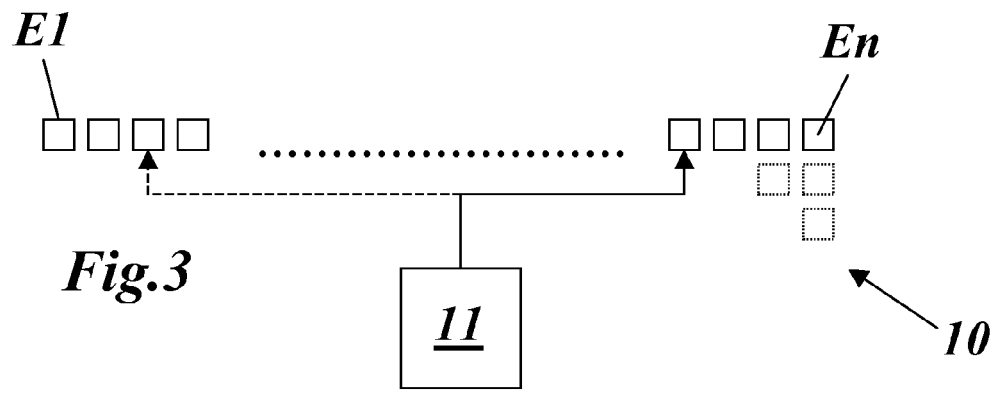
FIG. 3 shows the first measurement of the physical parameter P of the individual elements in the array shown in FIG. 2 before use for temperature determination.
Figure 4:
FIG. 4 shows the values of the physical parameter determined in the measurement shown in FIG. 3 for the individual elements in the array.

Now, as shown in FIG. 3, the value of the physical parameter P is determined at each of the measurement elements $E1, \ldots, En$ for the element array 10 as shown in FIG. 2, in a first measurement by the suitable measurement apparatus 11. As shown in FIG. 4, a linear array of measurement elements $E1, \ldots, En$ then results in a linear series of associated P values, $P_1, P_2, P_3, \ldots, P_{n-2}, P_{n-1}, P_n$; a 2-dimensional array and measurement elements Ex will correspondingly result in a 2-dimensional matrix of P values.

Figure 5:
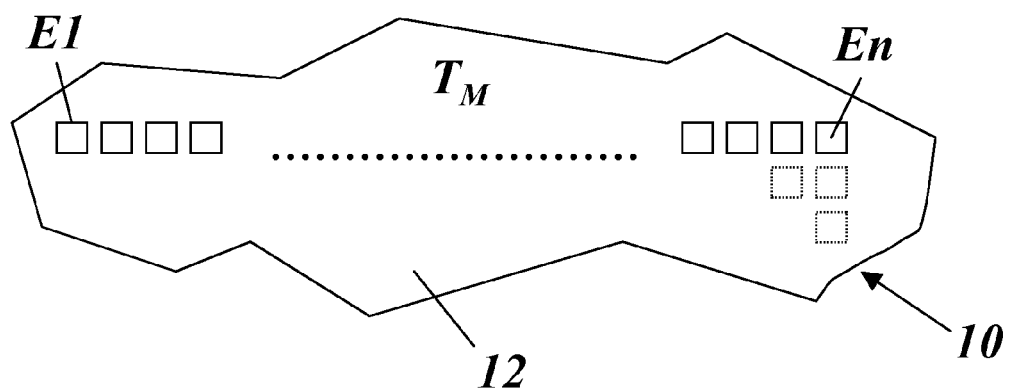
FIG. 5 shows the use of the element array in a thermal machine, for example a gas turbine.

After the first determination of the P-values, the element array 10, as shown in FIG. 5, is fitted to the point selected for temperature measurement on a machine part 12 or the like and is subjected to an operating temperature $T_M$ there throughout the duration of the measurement.

Figure 6:
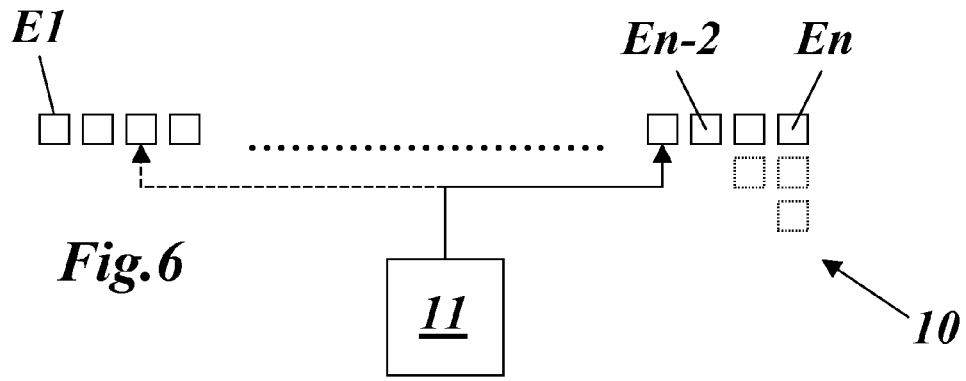
FIG. 6 shows the second measurement of the physical parameter P of the individual elements in the array shown in FIG. 2, after use for temperature determination.
Figure 7:
FIG. 7 shows the values of the physical parameter determined during the measurement shown in FIG. 6 for the individual elements of the array.

Then, in a second measurement (FIG. 6), the P values of the individual measurement elements $E1, \ldots, En$ of the element array 10 are then measured. This measurement now results in a series of P-values $P'_1, P'_2, P'_3, \ldots, P'_{n-1}, P'_{n-1}, P'_n$, which in general differ from the P values $P_1, P_2, P_3, \ldots, P_{n-2}, P_{n-1}, P_n$ from the first measurement. This applies to the measurement elements Ex whose heat treatment temperature $T_{HT}$ differs from the operating temperature $T_M$. The operation of the operating temperature $T_M$ results in these measurement elements in practice being subjected to a heat treatment at a different heat treatment temperature, as a result of which their value of the physical parameter P changes. Only for that measurement element Ex whose heat treatment temperature $T_{HT}$ is equal to the operating temperature $T_M$, or differs only slightly from it, does the value of the physical parameter P not change, or changes only slightly.

By pair-by-pair comparison of the P values $P_1, P_2, P_3, \ldots, P_{n-2}, P_{n-1}, P_n$, measured before use, with the P values $P'_1, P'_2, P'_3, \ldots, P'_{n-2}, P'_{n-1}, P'_n$, measured after use, it is possible to determine in a simple manner the measurement element Ex whose P value has not changed, or is virtually unchanged. The heat treatment temperature associated with these measurement elements is then equal to or approximately equal to the operating temperature $T_M$ during use at the location of the element array 10.

Figure 8:
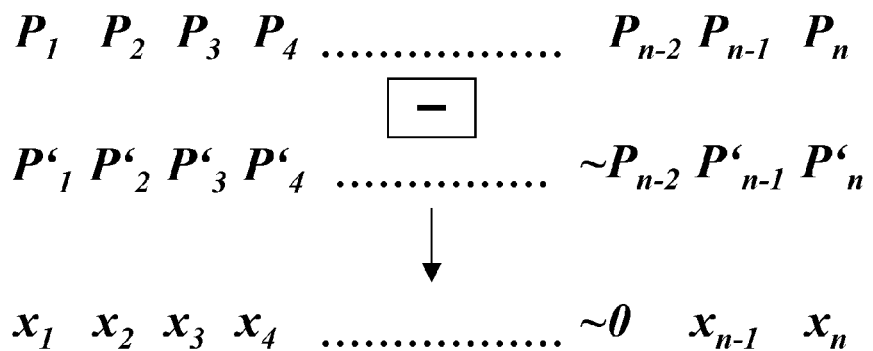
FIG. 8 shows the comparison of the results of the two measurements in the form of a subtraction of the value matrices.

If the mathematical comparison method is subtraction, the comparison can be formalized by subtracting the rows or matrices of the measured P values from one another before and after use, as is illustrated schematically in FIG. 8. For the measurement element E1, the subtraction $P_1-P'_1$ results in a difference value $x_1$, the subtraction $P_2-P'_2$ for the measurement element E2 results in a difference value $x_2$, etc.

If, for example, it is found that the measured value $P'_{n-2}$ is approximately equal to the measured value $P_{n-2}$, the subtraction results approximately in the difference value 0 (FIG. 8). This can be used to deduce that the operating temperature $T_M$ to be measured was approximately equal to the heat treatment temperature $T_{n-2}$ of the measurement element $E_{n-2}$.

The measurement method can be summarized, once again, as follows:

(1) Thermal memory elements are produced.
(2) The elements are preset by a heat treatment, with each element being subjected to a different heating temperature.
(3) The preset elements are combined in a suitable array (1-, 2-, or 3-dimensional).
(4) Specific physical characteristics (parameters) of the elements are measured and stored.
(5) The element array is installed at the measurement location and is subjected to the operating temperature there.
(6) After completion of operation, the array is removed and the selected physical characteristics of the elements are measured again.
(7) The measured values are compared in pairs, for example by subtraction from one another. In the case of subtraction, that element whose values have changed the least and which is therefore most severely affected by the subtraction has a heat treatment temperature which comes closest to the operating temperature.

The proposed new measurement method is a relative measurement, and not an absolute measurement. It allows precise, low-cost measurement of the thermal operating conditions in gas turbines and boilers. Different temperature ranges can be covered depending on the material of the elements used, thus allowing the method to be used for thermal apparatuses with different operating temperatures.

LIST OF REFERENCE SYMBOLS

10 Element array
11 Measurement apparatus
12 Machine part
E1, . . . , En Measurement element (passive)
P, $P_1$, . . . , $P_n$ Parameter (temperature-dependent)
$T_{HT}$, $T_1$, . . . , $T_n$ Temperature of the heat treatment
$T_M$ Operating temperature (of the machine)

What is claimed is:

1. A method for passive determination of an operating temperature in a thermally highly loaded device, comprising:

providing a plurality of individual passive measurement elements, which have at least one measurable physical parameter that depends unambiguously on a constant temperature which is set during heat treatment of the measurement element or of a material which is used in the measurement element, and which parameter is set differently for each of the different measurement elements, combining the individual measurement elements to form an array such that the entire array is subjected to essentially only one temperature during the measurement of the operating temperature;

determining, in a first measurement, values of the physical parameter for all the measurement elements in the array, before the array is subjected to the operating temperature to be measured;

subjecting the array, over a time period, to the operating temperature to be measured in the device;

determining, in a second measurement, values of the physical parameter for all the measurement elements in the array; and comparing the values of the physical parameter measured in the first and the second measurement for each of the measurement elements with one another and the temperature of the heat treatment of that measurement element whose value of the physical parameter has changed the least in the two measurements is taken as the measured temperature.

2. The method as claimed in claim 1, wherein in the course of comparing the values from the first and the second measurement, the measured values of the physical parameter are subtracted from one another in pairs.

3. The method as claimed in claim 1 wherein, in order to set the different physical parameter in the measurement elements, the measurement elements are each subjected to a heat treatment at a different temperature.

4. The method as claimed in claim 3, wherein the different temperatures of the heat treatment are in a predetermined temperature range and are distributed uniformly over the predetermined temperature range.

5. An apparatus for carrying out passive determination of an operating temperature in a thermally highly loaded device, the apparatus comprising a plurality of individual passive measurement elements which have at least one measurable physical parameter that depends unambiguously on a constant temperature which is set during heat treatment of the measurement element or of a material which is used in the measurement element, and which parameter is set differently for the different measurement elements, wherein the individual measurement elements are combined to form an array such that the entire array is subject to essentially only one temperature during the measurement of the operating temperature.

6. The apparatus as claimed in claim 5, wherein the measurement elements are solid bodies with a volume of a few mm$^3$.

* * * * *